United States Patent [19]

Haskins et al.

[11] Patent Number: 4,943,051
[45] Date of Patent: Jul. 24, 1990

[54] HUMAN ENERGY TRANSMISSION DEVICE

[76] Inventors: Don Haskins, 22622 Lake Side La., El Toro, Calif. 92630; Lauren D. Haskins, Jr., 17565 Brightman Ave., Lake Elsinore, Calif. 92330

[21] Appl. No.: 77,697
[22] PCT Filed: May 27, 1986
[86] PCT No.: PCT/US86/01119
§ 371 Date: Jun. 19, 1987
§ 102(e) Date: Jun. 19, 1987
[87] PCT Pub. No.: WO87/07167
PCT Pub. Date: Dec. 3, 1987
[51] Int. Cl.$^5$ .................. A63B 69/06; B62M 29/00; B63H 16/00
[52] U.S. Cl. .................. 272/72; 272/130; 272/136; 114/363; 280/12.11; 441/21; 441/101
[58] Field of Search .......... 272/71, 72, 73, 93, 272/120, 126, 130, 134, 135-142; 114/280, 363; 297/377, DIG. 9; 280/12.11-12.14; 440/21, 24, 94, 101, 104, 105; 411/60

[56] References Cited
U.S. PATENT DOCUMENTS

| | | | |
|---|---|---|---|
| 89,663 | 5/1869 | Heroux | 440/101 X |
| 818,986 | 4/1906 | Tubbs | 114/363 |
| 2,033,637 | 3/1936 | Kaiser | 114/363 X |
| 2,557,972 | 6/1951 | Jewett | 114/363 |
| 2,586,024 | 2/1952 | Glasgow | 272/72 |
| 3,446,503 | 5/1969 | Lawton | 272/120 |
| 3,792,860 | 2/1974 | Selnes | 272/120 X |
| 4,300,760 | 11/1981 | Bobroff | 272/120 |
| 4,728,099 | 3/1988 | Pitre | 272/72 |

FOREIGN PATENT DOCUMENTS 2528762 1/1977 Fed. Rep. of Germany ........ 272/72

Primary Examiner—Robert W. Bahr
Attorney, Agent, or Firm—Albert O. Cota

[57] ABSTRACT

A propulsion and exercise device transmitting human energy from both the upper and lower body simultaneously. A frame (20) contains a rotatable upwardly extending mast (30) to which a foot engaging structure (38) is attached by linkage (48). A collapsible backrest (22) is situated on the frame and movable arms (62) with handles (56) are attached to the mast. Mechanical advantage and energy transmission is accomplished by pushing the foot engaging structure forward with ones legs while pulling the handles rearward propelling a vehicle or exercising the body.

14 Claims, 3 Drawing Sheets

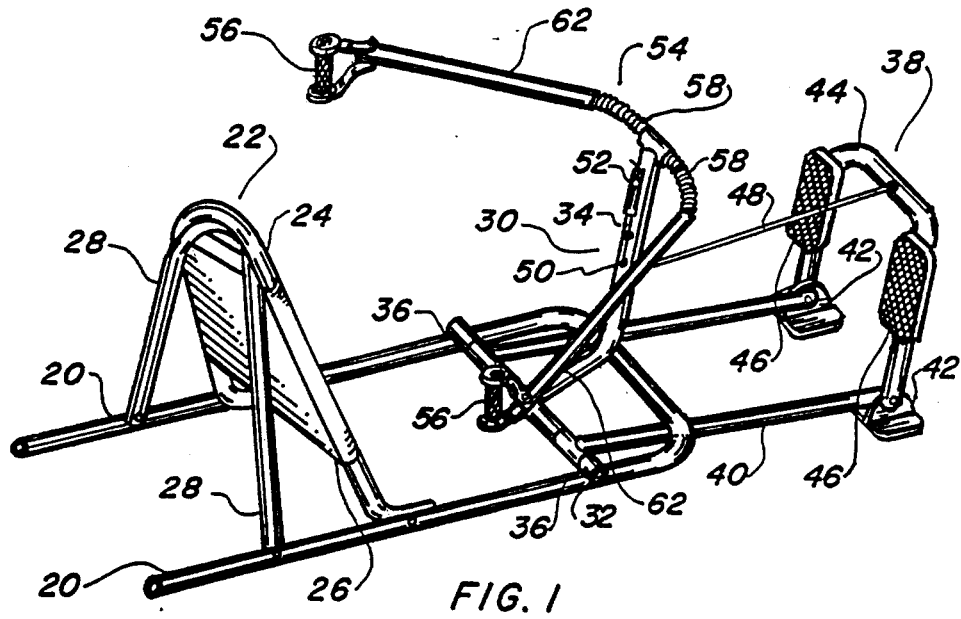
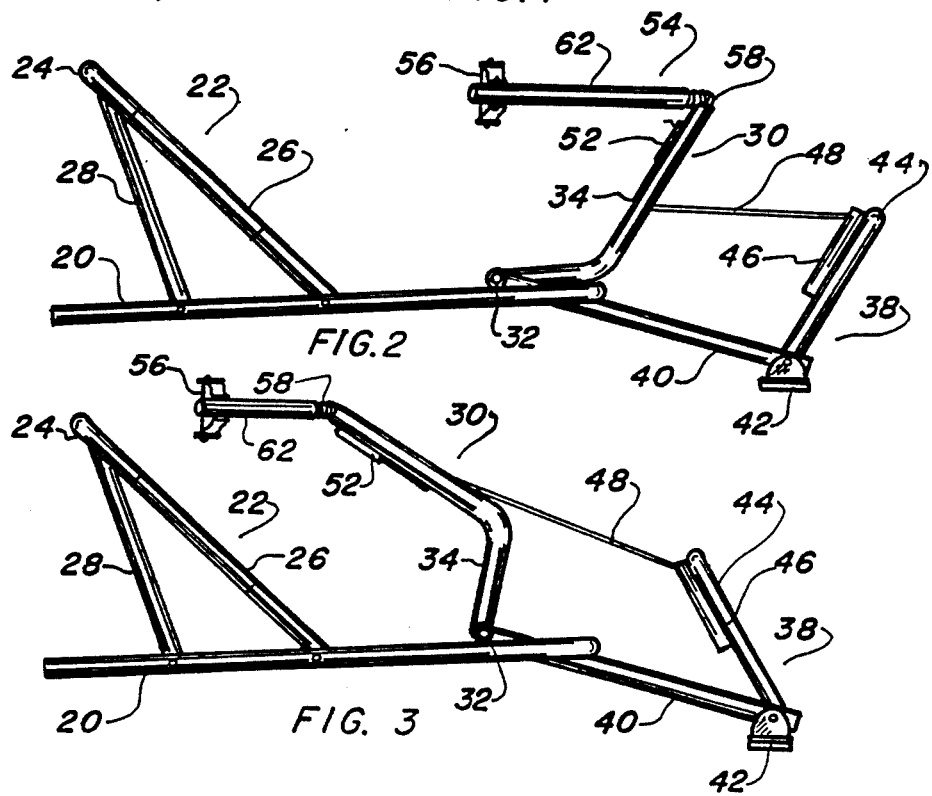

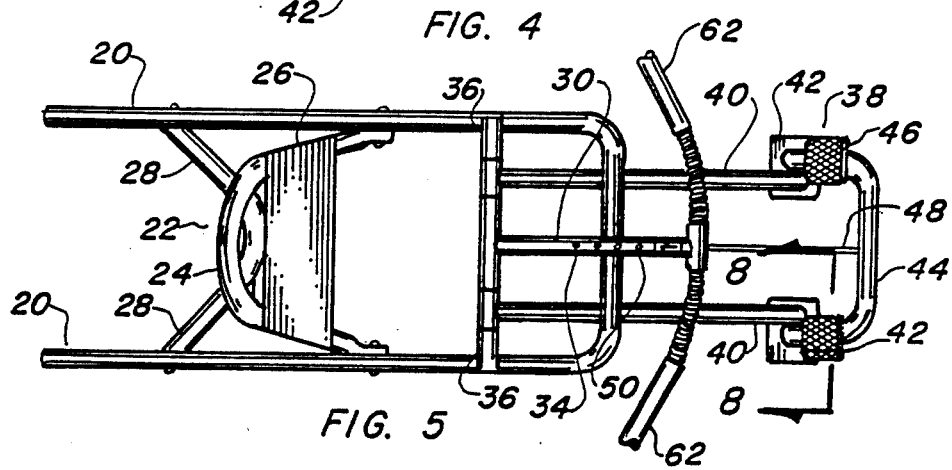
FIG. 4
FIG. 5
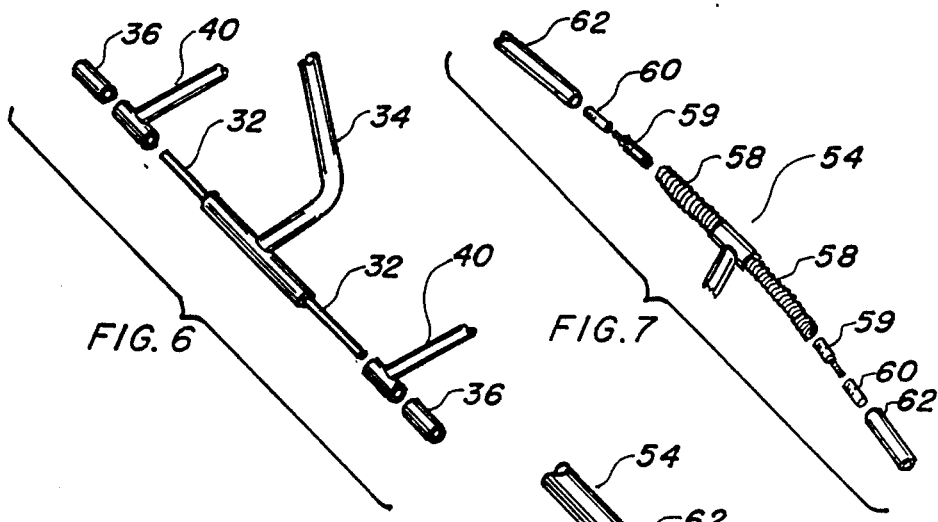
FIG. 6
FIG. 7
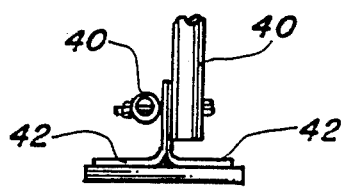
FIG. 8
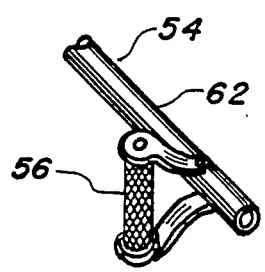
FIG. 9

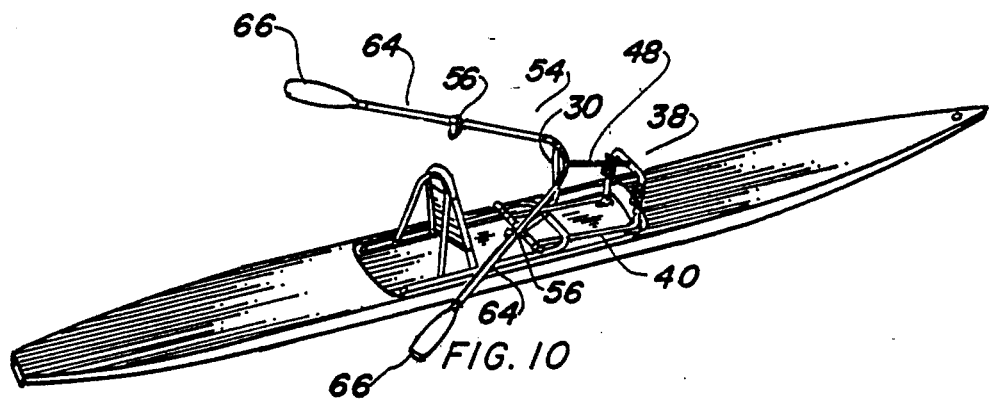
FIG. 10
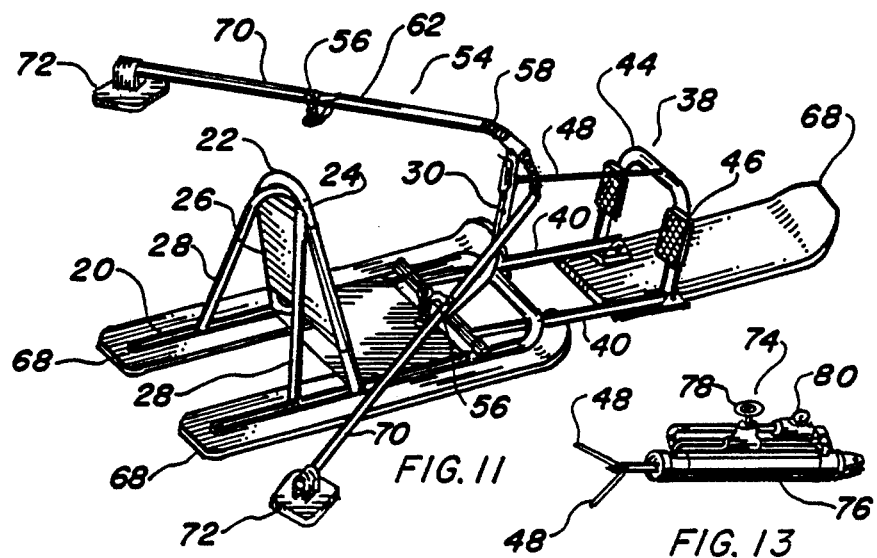
FIG. 11
FIG. 13
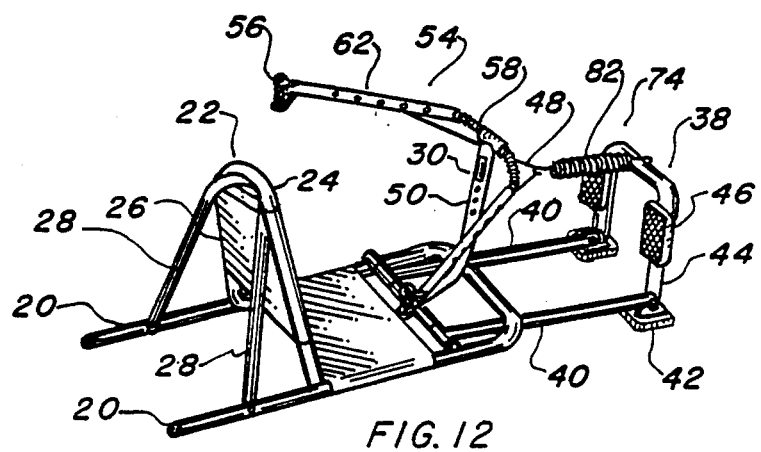
FIG. 12

HUMAN ENERGY TRANSMISSION DEVICE

TECHNICAL FIELD

The present invention relates to propulsion and exercise devices, in general and more specifically to a human energy transmission device adaptable to vehicles and to provide stationary muscular exercise.

BACKGROUND ART

Previously, many types of systems have been developed in the field of watercraft propulsion, such as oars in rowboats or rowing shells wherein the rower pulls a pair of oars against a pivot point creating the motivational force. Attempts have been made to improve this method of propulsion, including foot actuated paddles, sliding rowing seats, and specifically placed oar locks. Exercise machines have also attempted to duplicate this motion in a stationary manner. A search of the prior art did not disclose any patents that read directly on the claims of the instant invention, however, the following U.S. Patents were considered related:

| U.S. Pat. No. | Inventor | Issue Date |
| --- | --- | --- |
| 4,353,703 | d'Elloy | Oct. 12, 1982 |
| 3,802,008 | Gongwer | Apr. 9, 1974 |
| 3,204,699 | Gongwer | Sep. 7, 1965 |
| 3,204,262 | Gongwer | Sep. 7, 1965 |
| 3,122,759 | Gongwer | Mar. 3, 1964 |
| 2,557,972 | Jewett | June 26, 1951 |
| 2,033,637 | Kaiser | Mar. 10, 1936 |
| 818,986 | Tubbs | Apr. 24, 1906 |
| 188,131 | Harrington | Mar. 6, 1877 |
| 183,265 | Isaacs, Jr. | Oct. 17, 1876 |
| 89,663 | Heroux | May 4, 1869 | d'Elloy teaches a pedal operated nautical propulsion device utilizing a crank system producing circular motion, which is transmitted by a frame supported mechanism to a holder carrying a paddle, allowing the paddle to be driven into the water. This circular motion is translated into a vertical plane propelling the craft, which is, in turn, raised for another stroke.

Jewett utilizes an apparatus similar to the sliding seats used in rowing shells. Along with this movable seat, the oars are longer with supplemental outrigger oar lock sockets positioned outboard of the craft. This allows conventional oars and oar locks to be employed, however, altering the position of interface with the boat. The oar lock is extended outboard instead of on the gunwale, as normally employed.

Kaiser teaches a manual propelling and steering device for boats. The rowing takes place with the oarsman facing forward on a movable seat. Foot rests are provided that are stationary, and a standard supports a pair of oars that are hinged on the end and gripped along the shaft with no provision changing the angular pitch of the blade.

The oars are convertible, allowing them to be removed and attached together to form a paddle with the standard folding down, out of the way for convenience.

Tubbs employs oars mounted in locks on each gunwale with cables, or other suitable flexible traction elements, attached from the oars to a hinged seat. In operation the oarsman moves back and forth while stroking, rocking the seat forward on pivots with power being applied to the oars through the cables assisting the arm movement. The motion becomes uniform and simultaneous owing to the connection of the rod transmitting motion from the seat to the oars.

Heroux practiced over a century ago a foot cross bar attached on each end with a chain to a lever pivoting on the front edge of a seat. These levers connect to the oars on the opposite end. In operation the oarsmans feet are drawn back and pushed forward at each stroke of the oars, assisting the propulsion of the watercraft with the oars used in a conventional manner.

For background purposes and as indicative of the art to which the invention relates reference may be made to the remaining cited patents issued to Gongwer, Harrington, and Isaacs, Jr.

DISCLOSURE OF THE INVENTION

As more medical knowledge has been gained and people have become aware of the benefits of regular exercise, many have turned to sports equipment that accomplish this end and yet produce enjoyment in the process. Rowing with a sliding seat is one of the best forms of iostonic exercise, as it uses almost all of the human muscles in the process. This is apparent by the use of rowing machines as standard fitness equipment in homes and health clubs throughout the world that have been in use for many years. It has been noted, however, that recreational rowing has not enjoyed the growth as other propulsion equipment, such as bicycles. One of the main reasons is that roads are more accessible than waterways, and sliding seat rowing has been limited primarily to long, narrow, unstable shells intended for racing. Another reason is that people would rather paddle forward than row backward. Conventional kayaks and canoes however require all of the motivating force to be supplied by the arms back and shoulders only.

It is, therefore, a primary object of the invention to provide a human energy transmitting device that will use both upper and lower muscles of the body while propelling a moving vehicle in the forward seated position. Further, this mechanical device is not limited to propelling a small human powered watercraft alone, but by the substitution of traction pads for the oar blades and a runnered sled, instead of a watertight hull the same mechanism may be used to propel a vehicle over snow or ice. Further, the apparatus may substitute a hydraulic cylinder, pneumatic cylinder, or extension spring and be used as an exercise machine.

In all cases the work, or resistance (force times distance), may be adjusted to shift the proportionate energy from the arms to the legs. This becomes an important object and is accomplished by moving the thrust linkage either up or down on the mast. With the connecting point higher, the legs do less work, placing the burden on the arms. The reverse takes place when the linkage is lowered. A similar effect is produced by the position of ones feet up or down on the foot pads. In the exercise embodiment, the linkage is tied directly into the apparatus arms and the distance is simply adjusted in a like manner.

Another very important object of the invention allows the use of a stationary backrest. One of the drawbacks of conventional rowing is the strain the back is placed under. The recumbent position coupled with the adjustable arm and leg power input allows efficient use of the expended energy while producing little torque on the lumbar region of the back. Rowing machines with sliding seats are notorious for the high level of force that is placed on the back.

Still another object of the invention allows the body to remain stationary. There is, therefore, no wasted energy dissipated accelerating and decelerating the body mass. This also prevents a shift in the center of gravity which causes the boat to pitch or porpoise up and down. This pitching action is especially noticeable on shorter boats.

As previously mentioned, yet another object of the invention allows the energy to be converted into forward propulsion of the vehicle. This direction is very important if the apparatus is used with the boat embodiment in a busy harbor, or bay, where power boats may not see a small individually powered craft, thereby creating a dangerous condition. Likewise, over snow it would be extremely difficult, if not impossible, to propel the vehicle backwards through trees and along trails.

A further object of the invention allows the mechanism to be adapted to a number of vehicles and be stored in a collapsed condition. The device need not be permanently attached to just one vehicle, as it may be easily removed each time it is in use, and collapsed for transportation and storage. This allows the same device to be used for summer sports on the water or on the snow during winter and at home for basic exercise at any time.

A final object is the ability of the device to be controlled in the pitch angle of the blades when used as oars. As handles are provided, the angle is easily changes in the wrists during the power stroke and while removing the blades from the water. This ability is intuitively controlled and allows the most efficient use of the oars. These handles also provide a very confortable, efficient wrist position. The hands are perpendicular to the ground (or water), and parallel to the person's forearms for efficient force transmission and reduced wrist strain.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment completely removed from a vehicle.

FIG. 2 is a side elevational view of the preferred embodiment with the foot engaging means and mast in the forward position.

FIG. 3 is a side elevational view of the preferred embodiment with the foot engaging means and mast in the rearward position.

FIG. 4 is a side view of the preferred embodiment in the collapsed position.

FIG. 5 is a plan view of the preferred embodiment.

FIG. 6 is an exploded view of the pivotal mast completely removed from the invention for clarity.

FIG. 7 is an exploded view of the energy transmitting means completely removed from the invention for clarity.

FIG. 8 is a cross-sectional view taken along lines 8—8 of FIG. 5.

FIG. 9 is a view of one of the handles completely removed from the invention for clarity.

FIG. 10 is a partial isometric view of the preferred embodiment attached to a watercraft.

FIG. 11 is a partial isometric view of the preferred embodiment attached to a sled.

FIG. 12 is a partial isometric view of the preferred embodiment utilizing the device as an exercise apparatus.

FIG. 13 is a partial isometric view of the resistance brake.

BEST MODE FOR CARRYING OUT THE INVENTION

The best mode for carrying out the invention is presented in terms of a preferred, second and third embodiments. All three embodiments are primarily designed utilizing the same basic structure with the addition of a separate element and attachment to a particular vehicle or apparatus.

The preferred embodiment, as shown in FIGS. 1 through 10 is comprised of elements including attachments that form a human powered watercraft. The second embodiment utilizes a sled defining an over the snow vehicle with the third embodiment employing a mechanical resistance brake for use as an exercise apparatus.

The device uses a main frame 20 having parallel sides in "U" shape in planar orientation joining the parallel sides together forming a unitary element. While the closed end of the "U" is preferably on the same plane, it may be raised slightly for mounting upon flat surfaces. The frame 20 further contains a structural backrest 22 that projects upwardly from the frame at a point to the rear of the center. This structural rest is collapsible and consists of a continuous backrest frame 24 in "C" shape with each end rotatably connected to the main frame 20. The "C" shape is perhaps the same width and height as ones back and a cover 26 is tightly stretched between the upstanding sides. This cover 26 may be of a resilient material, such as cloth fabric, thermoplastic, or may even be rigid of a material such as plywood, plastic, metal, or the like. The cover 26, in any case, supports the majority of the operators back and may be straight, as illustrated, or contoured outward in the lumbar region and inward in the dorsal area adding to the comfort of the user.

In order to maintain the rest in a 45 degree angle position while pivoted at the bottom, a "C" shaped support strut 28 is employed. This strut 28 is similar in shape and attachment to the backrest frame 24 and projects upward from the main frame 20 immediately behind the frame of the backrest 24. The configuration of both vertical members is such that the strut 28 interlocks on the inside of the backrest 24 at the top and provides a folding structural truss of sufficient strength and rigidity to rest ones back while pushing thereagainst during the operation of the invention.

A pivotal mast 30 is disposed between the parallel sides of the frame 20 and is used as a lever for transmission of human power from both the upper and lower body members. This mast consists of a cross member 32 that is fixably attached on each end to the frame 20. An upright member 34 is rotatably affixed upon the cross member 32 in the middle with spacers 36 on each end.

Also connected to the mast 30 are rotatably attached foot engaging means 38 consisting of a pair of frame extension legs 40 that effectively lengthen the main frame 20 in planar relationship. A pair of swivel support brackets 42 are rotatably fixed onto the ends of the legs 40 for mounting upon a flat surface. These brackets 42 are formed of opposed angles, or in tee-shape, and contain a resilient pad on the underside. This pad may be of any material suitable for the purpose, such as solid or foamed synthetic rubber, thermoplastic, or a natural fiberous substance. Connected between the legs 40 and onto the brackets 42 is a vertical inverted loop member 44 providing not only mechanical communication but a movable base for engaging ones feet when operating the device. A pair of foot pads 46 are affixed to the vertical portions of the loop 44 in the appropriate position for this purpose, thereby extending the area and providing a comfortable working surface. The foot pads 46 may be of any material of the same composition as the pads noted above.

A thrust link 48 has one end pivotally mounted on the foot engaging means 38 and the other end onto the mast 30 for reciprocation of the mast 30 when force is applied upon the foot engaging means 38. This interconnection transmits the force from ones feet to the mast 30 when extendably pushing the pads 46 with the feet while ones back is braced against the rest 22. This type of action allows the maximum power of the legs to be used while being comfortably seated with the legs in an optimum thrust position. This link 48 may be solid or flexible, as long as it does not stretch excessively. A metallic rod may be utilized with swivels on each end, or a rope of synthetic fiber, such as dacron, or any other material, however, a wire rope is preferred since all of the qualities are fulfilled and the strength and wear resistance are optimal. An adjustment is incorporated into the mast 30, preferably comprised of a plurality of grommeted holes 50 allowing the link 48 to be moved up or down in relation to the cross member 32. This adjustment allows the length to correspond with ones body physique and the desired ratio of arm to leg resistance as applied to the device. The adjustment, however, is not limited to holes 50 alone, as any other type of connection may be satisfactorily employed, such as a sliding clamp, or an adjustable sleeve, or the like. A locking mechanism 52 is preferably used in conjunction with a fabric or wire rope and is illustrated in FIG. 6. This mechanism 52 is attached to the mast 30 and receives the end of the rope in wedging fashion creating an easily readjustment in distance from the mast 30 to the foot pads 46 to accommodate different operators of the device. The rope is simply pulled out of the wedge, shortened or lengthened by the selection of the hole 50, and replaced in the vee-shaped wedge.

The majority of the-structure is made of hollow tubes, as pictorially illustrated in FIGS. 1 through 5, formed into the desired shape and connected with appropriate fastening means, such as rivets, roll pins, or threaded fasteners. The material is preferably aluminum or stainless steel, however, a myriad of materials may be used with equal ease, such as magnesium, electroplated or galvanized steel, solid wood, or glass reinforced thermoplastics, also combinations of the above. The manufacturing techniques and fastening means are well known in the art.

Energy transmitting means 54 having handles 56 are attached to the uppermost portion of the mast 30 with a connecting spring 58, as shown in FIG. 7. This allows a combined linear force from both the hands and feet to transmit one total energy from both the upper and lower portions of the body onto a resistance medium. This arrangement is illustrated assembled in FIG. 1 and separated in FIG. 7 in an exploded view. The connecting spring 58 is contained within a tee-shaped hollow formed in the end of the mast 30 and extends an equal distance on each side. A threaded sleeve 59 consisting of a hollow metallic cylinder with a bolt and nut extended therethrough is forced into each end of the spring and positioned with a screw, rivet, roll pin, or the like. A hollow arm 62 containing the handle 56 is positioned over a threaded female bushing 60 and attached with a fastener, and screwed into the threaded portion of the cylinder 59. The bushing is made of any machinable or castable material with acetal homopolymer made under the registered tradename DELRIN by E. I. DuPont de Nemours and Co., Inc., being preferred. The arm 62 is of the same material as the frame 20 and is of a length comfortable to being grasped by ones hands on each end with the threads allowing rotation therewith.

The application of this device is completed in one of the embodiments shown in FIGS. 10 through 12. The preferred embodiment is illustrated in FIG. 10 with the resistance medium consisting of water, and the device attached directly to a watercraft, such as a boat. In order to accomplish this utility a pair of oars 64 are added to the ends of the arms 62. The oars 64 have blades 66 on the opposite ends and interconnect with the arms 62 into a socket, or the like. In operation, the oars 64 are placed in the water with the operators knees bent and in the forward position and with the mast in a rearward position as shown in FIG. 3. The propulsion stroke is made by pushing the feet forward against the pads 64 while simultaneously pulling the handles 56 rearward, causing the craft to be impelled forward in the water. The pitch of the blade 66 is controlled by the angle of the wrists, as the spring 58 allows both linear and axial movement of the oar to be accomplished. FIG. 2 shows the device in the final stage of the propulsion stroke where the oars are lifted from the water by the handles 56.

The second embodiment is illustrated in FIG. 11 with the resistance medium consisting of snow and the device is attached directly to a type of sled 68 with a contour compatible to the snow and an upturned forward end. The sled 68 may have individual runners with a seat in between, or may be an integral unit made of metal or fiberglass formed or molded into the required configuration. A pair of extension arms 70 having traction pads 72 on the end connect to the arms 62 in the same socket-like manner. In operation the pads 72 engage the surface of the snow with the force applied in the same fashion as the preferred embodiment.

The third embodiment is illustrated in FIGS. 12 and 13 with the resistance medium constituting mechanical opposition in the form of a brake 74 that extends the thrust link 48 directly to the mast 30. The brake 74 is either a spring loaded cylinder 76, shown in FIG. 13, with a combination needle valve 78 and check valve 80, or a tension spring 82, as illustrated in FIG. 12. In either case, the thrust link 48 still attaches to the mast 30 but indirectly to each arm 62 in an adjustable manner. This relocation of the link 48 allows resistance to be distributed to both the arm and leg functions of the device. This embodiment functions as an exercise apparatus used by creating an energy consuming stroke pushing the foot pads 46 forward with ones legs while simultaneously pulling the handles 56 rearward, exercising the arm, shoulder and leg muscles. The tension spring 82 is a simple friction device and the cylinder 76 may be pneumatic or hydraulic, with the needle valve 78 adjustable to create the desired resistance, and the check valve 80 contained within the closed circuit allowing the cylinder to return to its normal position at the conclusion of the power stroke.

For storage and transportation, the device may have the oars 64 or arms 70 removed from the remainder folded flat into a convenient package, as shown in FIG. 4.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A human energy transmitting device comprising:
   (a) a main frame having parallel sides and a structural backrest;
   (b) a pivotal mast disposed between the parallel sides of said frame defining a compound lever freely rotatable thereupon for transmission of human power from combined body members;
   (c) rotatable foot engaging means operatively connected to said frame in a planar relationship positioned in such a manner as to be contiguous with ones feet when in the sitting position between the parallel sides of the frame while recumbently reclining on the backrest;
   (d) a thrust link freely reciprocable having one end pivotally mounted on the mast and the other end pivotally mounted on the foot engaging means for reciprocation of the mast when pressure is exerted upon the foot engaging means transmitting the force from ones feet when extendably pushing against the backrest to the mast; and,
   (e) energy transmitting means having handles thereupon yieldingly connected to said mast, receiving combined linear force from both the foot engagement and the handles when gripped thereupon transmitting ones total energy from both the upper and lower parts of the human body onto a resistance medium.

2. The invention as recited in claim 1 wherein said frame further comprises a "U" shape in planar orientation joining the parallel sides together forming a unitary element.

3. The invention as recited in claim 1 wherein said backrest is collapsible allowing the device to be folded flat for transportation and storage.

4. The invention as recited in claim 3 wherein said collapsible backrest further comprises:
   (a) a continuous backrest frame in "C" shape with each end rotatably connected to and upwardly distending from said main frame defining a structural rest for support of ones back;
   (b) a cover disposed on said backrest tensioningly stretched between the upwardly projecting members forming a surface for distributing body mass thereupon; and,
   (c) a support strut in "C" shape with each end rotatably connected to and upwardly projecting from said main frame immediately behind said backrest frame configured in such a manner as to interlock with the strut inside of the backrest providing a folding structural truss for resting ones back upon while pushing thereagainst during the delivery of force to the energy transmitting means.

5. The invention as recited in claim 1 wherein said mast further comprises:
   (a) a cross member between said parallel sides of the frame forming a stationary attaching structure, said foot engaging means being rotatably affixed on the cross member;
   (b) an upright member rotatably affixed upon the cross member in the center thereof; and,
   (c) a plurality of spacers on said cross member between the upright member and said foot engaging means positioning the upright member in a spaced relationship to the foot engaging means.

6. The invention as recited in claim 1 wherein said foot engaging means further comprise:
   (a) a pair of frame extension legs rotatably connected to said pivotal mast essentially lengthening the frame;
   (b) a pair of swivel support brackets rotatably fixed to said extension leg at the end for mounting upon a flat surface; and,
   (c) a vertical inverted loop member disposed between the extension legs and pivotally connected to the support brackets providing a movable base for engaging ones feet.

7. The invention as recited in claim 6 further comprising a pair of foot pads configured to receive ones feet, the pads disposed upon said frame extension in such a manner as to increase the working surface of the foot engaging means.

8. The invention as recited in claim 1 wherein said thrust link further comprises an adjustment mechanism allowing the link to be adjusted in length to correspond with ones body physique and stroke of the foot engaging means in relation to the mast.

9. The invention as recited in claim 1 wherein said resistance medium constitutes water, the device is attached to a watercraft, and the energy transmitting means further comprise a pair of oars having blades on the ends thereof, such that an operator may propel the craft by placing the oars into the water when the operators knees are bent and the mast is rearwardly positioned characterizing a propulsion stroke by pushing the foot engaging means forward with ones legs while simultaneously pulling the handles rearward, causing the craft to be impelled forward in the water.

10. The invention as recited in claim 1 wherein said resistance medium constitutes snow, the device is attached to a sled and the energy transmitting means further comprise a pair of extension arms having traction pads on the ends thereof, such that an operator may propel the sled by placing the pads on the surface of the snow when the operators knees are bent and the mast is rearwardly positioned characterizing a propulsion stroke by pushing the foot engaging means forward with ones legs while simultaneously pulling the handles rearward, causing the sled to be impelled forward on the surface of the snow.

11. The invention as recited in claim 1 wherein said resistance medium constitutes mechanical opposition and the energy transmitting means further comprise a resistance brake adjustably extending said thrust link directly to the energy transmitting handles creating mechanical friction characterized by an energy consuming stroke, such that an operator pushing the foot engaging means forward with ones legs while simultaneously pulling the handles rearward exercising the muscles in ones arms, shoulders, and legs.

12. The invention as recited in claim 11 wherein said resistance brake further comprises a spring loaded hydraulic cylinder integrally connected on the compressible side with a check valve providing resistance in one direction.

13. The invention as recited in claim 11 wherein said resistance brake further comprises a tension spring providing resistance in one direction.

14. A human energy transmitting device attached to a watercraft comprising:
  (a) a main frame having parallel sides and a structural backrest that is collapsible.
  (b) a pivotal mast disposed between the parallel sides of said frame defining a compound lever freely rotatable thereupon for transmission of human power from combined body members;
  (c) rotatable foot engaging means having foot pads operatively connected to said frame in a planar relationship positioned in such a manner as to be contiguous with ones feet when in the sitting position between the parallel sides of the frame while recumbently reclining on the backrest;
  (d) an adjustable thrust link freely reciprocable having one end pivotally mounted on the mast and the other end pivotally mounted on the foot engaging means for reciprocation of the mast when pressure is exerted upon the foot engaging means transmitting the force from ones feet when extendably pushing against the backrest to the mast;
  (e) energy transmitting means having handles thereupon yieldingly connected to said mast receiving combined linear force from both the foot engagement and the handles when gripped thereupon transmitting ones total energy from both the upper and lower parts of the human body to the water for propulsion; and,
  (f) a pair of oars having blades on the ends attached to said energy transmitting means, propelling the craft by placing the oars into the water when the operators knees are bent and the mast is rearwardly positioned characterizing a propulsion stroke by pushing the foot engaging means forward with ones legs while simultaneously pulling the handles rearward causing the craft to be impelled forward in the water.

* * * * *